Patented Nov. 22, 1938

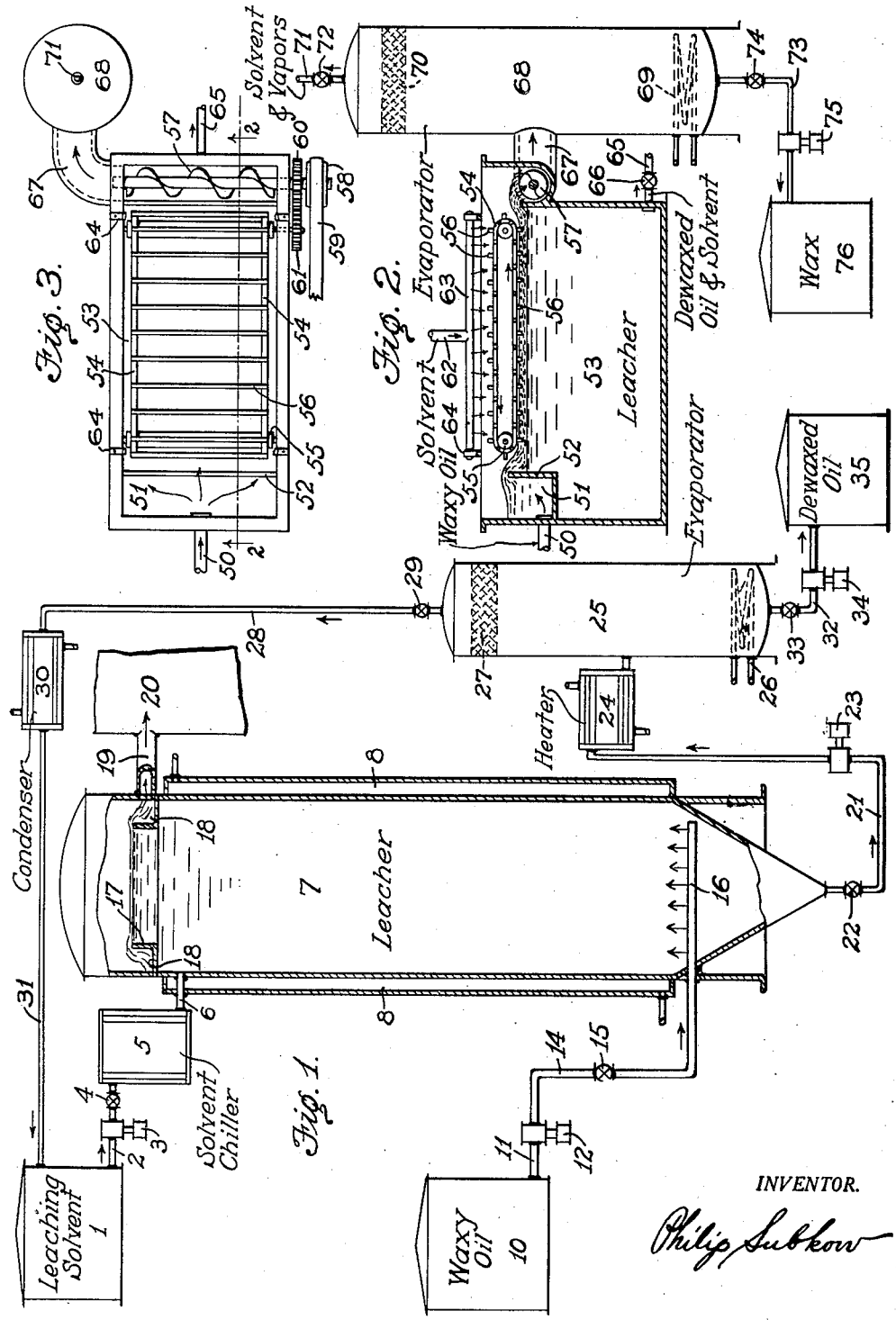

2,137,549

UNITED STATES PATENT OFFICE 2,137,549

METHOD FOR DEWAXING OILS

Philip Subkow, Los Angeles, Calif., assignor to Union Oil Company of California, Los Angeles, Calif., a corporation of California Application May 10, 1935, Serial No. 20,816

12 Claims. (Cl. 196—18)

The present invention relates to a method for separating wax from petroleum oils. The invention relates particularly to a process for producing lubricating oil by separating the wax therefrom by a process corresponding to a leaching of the oil from the solidified particles of wax and oil by means of a suitable solvent. The invention is also adapted to separate oil contained from wax cake, such as slack wax. Such oily wax mixtures usually contain considerable quantities of oil.

It has heretofore been proposed to separate wax from oils by spraying the waxy oil into a cold diluent or solvent maintained at a low dewaxing temperature, say —40° F. whereupon the waxy oil becomes crystallized or solidified to form congealed masses of oil and wax. In such processes, the cold diluent is one having a specific gravity lower than the solidified particles of waxy oil so that as these particles settle gradually to the bottom of the container of chilled solvent, solution of the oil in the resulting solvent takes place corresponding to a leaching of the oil fractions from the wax matrices leaving the latter undissolved. The wax for the most part is obtained as large or coarse flakes which settle readily to the bottom of the vessel. To form a continuous counter-current system, the leaching solvent is introduced into the bottom of the vessel and the oil is sprayed in at the top and as the crystallized particles descend to the bottom of the vessel they contact the relatively purer solvent where they become freed for the most part of the occluded oil. The dewaxed oil solvent solution is drawn off at the top of the vessel and is passed to a suitable solvent recovery apparatus. The wax is withdrawn from the bottom of the leaching column and also treated to remove solvent.

I have discovered that if a leaching solvent which has a specific gravity above that of the waxy oil is provided as the solvent for dissolving the occluded oil in solidified wax-oil structures that the aforementioned process of introducing the leaching solvent at the bottom and the waxy oil at the top of the column may be reversed and that the oil solvent solution may be drawn off at the bottom of the leaching column as fractions substantially free from entrained wax particles and that the leached wax particles may be skimmed off or drawn off at the top of the leaching column. When employing the aforementioned process of using a leaching solvent of lower specific gravity than the waxy oil, it has been found that considerable quantities of finely dispersed solidified particles of wax were entrained in the oil solvent solution and withdrawn from the top of the column. If this solution is not filtered, the waxy particles are dissolved in the oil upon heating, to drive off the solvent with the result that the pour point of the oil is increased. In the present process, I employ a leaching solvent of sufficient difference in specific gravity over that of the waxy oil so that the discrete particles of wax will float to the surface of the solvent or oil solvent solution from which they may be withdrawn.

Another advantage of employing a leaching solvent having a specific gravity above that of the waxy oil so as to permit the wax structure to flow to the surface of the leaching surface resides in the fact that the wax structures particularly those fragile structures from which considerable quantities of oil have been leached are not readily disrupted or broken into finely dispersed particles. In the aforementioned process of employing solvents lighter than the wax structures, the latter descend to the bottom of the leaching column and the lowermost wax structures which generally contain the least amount of oil and therefore are the most fragile, must support the weight of the superimposed wax structures with the result that such structures are sometimes broken into finely dispersed wax particles which are difficult to separate from the oil solvent solution. When employing such heavy solvents, the solvent supports the weight of wax structures in the column.

In addition to the aforementioned higher specific gravity than the waxy oil, the leaching solvent must have a high solvent power for the oil contained in the solidified waxy oil particles and a low solvent power for the wax. As solvents for this purpose but without intending to limit my invention thereto, may be mentioned methylene chloride, ethylene chloride, trichlorethylene, trichlorethane, carbon tetrachloride, tetrachlorethylene, tetrachlorethane, BB' dichlorethylether, acetylene dichloride, furfural, and mixtures thereof. I may also employ mixtures of BB' dichlorethylether and ethylene dichloride or any of the aforementioned solvents, mixtures of hexachlorethane and acetone or benzol or aniline or chlorinated solvents mentioned above, mixtures of liquid sulfur dioxide and aniline or benzol or nitrobenzol or phenol, mixtures of nitrobenzol or phenol, each with benzol, or mixtures of other desirable solvents having a high solvent power for oil and a low solvent power for wax and which have specific gravities above that of the waxy oil. When using liquid sulfur dioxide in admixture with other solvents, it is preferable not to employ in excess of 25% of the liquid sulfur dioxide in the mixture. Thus a desirable mixture for this purpose is 25% $SO_2$–75% $C_6H_6$.

Also, the leaching solvent must be characterized by such specific gravities that when substantial quantities of oil are dissolved therein, the specific gravity of the solution must still be above that of the waxy oil or wax so as to permit the wax structure to flow to the surface of the solution and float thereon.

As a further modification of my invention, I may solidify the waxy oil in a form of a thin sheet on the surface of the cold leaching solvent and allow sufficient time for the solvent to leach the occluded oil in the solidified sheet which floats on the surface of the leaching solvent after which the substantially oil-free wax may be skimmed off from the surface of the leaching solvent by such mechanical means as paddles or skimmers which may pass the wax structure into a screw conveyor which forces the wax structure to a suitable recovery unit.

It is thus an object of my invention to accomplish dewaxing of waxy oil by introducing the waxy oil into a cold leaching solvent having a specific gravity higher than that of the oil and which effects solidification of the waxy oil and subsequently to leach the occluded oil from the solidified waxy oil by means of the high specific gravity leaching solvent.

It is a further object of my invention to effect solution of the waxy oil in a cold leaching solvent in a form of a thin sheet and allow sufficient time and contact to permit the leaching solvent of high specific gravity to remove occluded oil contained in the solidified sheet of waxy oil and subsequently skim off the substantially oil-free wax structure from the surface of the leaching solvent.

Other objects and advantages of my invention will be apparent from the following description of the invention taken from the drawing which is not to be considered as limiting my invention and in which:

Fig. 1 is a diagrammatic arrangement of apparatus for carrying out one modification of my invention;

Fig. 2 represents another modification, and

Fig. 3 is a plan of Fig. 2.

Referring more particularly to Fig. 1, the leaching solvent, such as, for instance trichlorethylene, is withdrawn from tank 1 and is pumped via line 2 by pump 3 through valve 4 and is cooled in solvent chiller 5 to a low temperature after which it is introduced via line 6 into the leaching column 7 provided with a cooling jacket 8.

The temperature to which the leaching solvent is chilled may vary from 0 to —40° F. depending upon the characteristics of the leaching solvent such as the temperature at which it solidifies. In general, the leaching solvent must not be chilled to such temperature as to impair its efficiency as a leaching solvent. It must be sufficiently fluid at the dewaxing temperature as to permit solution of the occluded oil contained in the solidified particles of oil and wax.

As stated previously, the leaching solvent must have a specific gravity above that of the solidified particles of wax and oil and must be of such character that when substantial quantities of oil are dissolved therein will still have a specific gravity above that of the undissolved wax. Under such conditions, the solidified wax and oil in passing through the leaching solvent upwardly will permit the wax to float on top of the solution of wax and oil.

Waxy oil, such as for instance, an SAE 20 lubricating oil distillate obtained from Sante Fe Springs crude oil, is withdrawn from tank 10 via line 11 by pump 12 and forced through line 14 controlled by valve 15 through perforated spider 16 positioned at the bottom of the leaching column 7. Upon contact with the cold leaching solvent, the waxy oil is solidified into disc or pea-like shapes and due to their lower specific gravity will gradually rise through the solvent to the surface thereof. In this upward passage, solution of the oil in the resulting solvent takes place corresponding to a leaching of the oil fractions from the wax matrices leaving the wax particles undissolved. The proportions of solvent and waxy oil introduced into the leaching column will vary, but in general, from 2 to 5 volumes of the solvent to one of the waxy stock will be sufficient to accomplish the desired leaching. The time of contact of the wax structure in the solvent will also vary depending upon the quantity of solvent employed, the character of the solvent and the conditions of contact, such as the size of the wax structures. In general, the height of the column is adjusted and the amount of solvent is regulated so that the wax structures in rising through the leaching solvent will be thoroughly leached of oil upon reaching the surface of the leaching solvent and oil solution.

The leached waxy matrices spill over baffle 17 into trough 18 from which they are withdrawn via line 19 and passed into a settling chamber 20 where the solvent and oil carried over with the wax particles may be drawn off from the bottom of the settler. The separated wax may be treated to recover solvent therefrom in the manner described in Fig. 2.

The solution of dewaxed oil and solvent is drawn off from the bottom of the leaching column via line 21 controlled by valve 22 and pump 23 through heater 24 and passed into evaporator 25 where the leaching solvent is vaporized aided by steam circulating through coil 26. The vaporized leaching solvent passing through mist extractors 27 is sent through line 28 controlled by valve 29 to condenser 30 where the solvent vapors are condensed and returned to the leaching solvent tank 1 via line 31. Dewaxed oil is withdrawn from the bottom of the evaporator via line 32 controlled by valve 33 and is pumped by pump 34 into dewaxed oil storage tank 35.

Referring to Figs. 2 and 3, I have shown another modification of a leacher which is adapted to solidified waxy oil in the form of thin sheets from which the occluded oil may be readily leached out by the leaching solvent. Again the leaching solvent employed is one which has a high specific gravity in comparison with the waxy oil so that the solidified waxy oil will float on the surface of the leaching solvent. In these figures, the waxy oil is introduced via line 50 and is passed into a trough 51 provided with a baffle 52 and spills over the baffle into the main section 53 which has previously been filled with leaching solvent at low dewaxing temperature. Upon spilling over the baffle, the waxy oil solidifies and as it is drawn to the opposite end of the leaching chamber a thin sheet is formed. To aid in the movement of the solidified waxy oil, I have provided a skimmer which comprises a pair of endless chains or belts 54 carried by sprockets or pulleys 55. Cross-bars 56 are fixed at regulated spaces to the pair of endless chains or belts. The skimmer is operated in a counter-clockwise direction and as the bars contact the solidified waxy oil it is drawn to the opposite end of the leaching column to screw conveyer 57 operated by pulley 58 connected by belt 59 which is connected to a suitable source of power not shown. Rotation of the pulley 58 causes rotation of gear 60 which is meshed with gear 61 and operates the skimmer.

The solidified waxy oil in passing from one end of the leaching column to the other is washed with cold leaching solvent introduced via line 62 and sprayed by spider 63 which is supported by brackets 64. The washing effect is aided by the gentle agitation caused by the rotation of the skimming device as the wax structures are dipped in and out of the solvent solution by the paddles or cross-bars. The solvent contacting the solidified waxy oil dissolves the occluded oil and the mixture being of a higher specific gravity than the solidified wax and oil, drops to the bottom of the leacher and is withdrawn via line 65 controlled by valve 66 and is sent to a solvent recovery unit such as shown in Fig. 1. The low dewaxing temperature is maintained in the leacher by the continuous introduction of cold leaching solvent. Preferably, the leacher is insulated or jacketed to prevent infiltration of heat. The leached wax collecting in screw conveyer 57 is forced through line 67 into evaporator 68 where solvent is vaporized aided by steam circulating through closed coil 69. The solvent vapors passing through mist extractors 70 are removed via line 71 controlled by valve 72 and sent to suitable recovery apparatus. The melted wax is withdrawn from the bottom of the evaporator via line 73 controlled by valve 74 and is pumped by pump 75 into wax storage tank 76.

While I have shown settling means 20 in Fig. 1 for separating undissolved oil and solvent from the wax matrices, it will be observed that I may effect further purification of the wax by introducing the slurry withdrawn via line 19 into a washing device such as shown at 53 where the slurry may be further washed with cold solvent. In such case the wax structure will of necessity be in small particles but by providing a skimmer such as shown at 54 such waxy particles may be gathered to the opposite end of the leacher and withdrawn via the screw conveyer shown. If desired, a skimming device such as shown for leacher 53 may be provided at the top of the leaching column 7.

Instead of withdrawing the oil solvent olution and wax structures as separate fractions from the leaching units, I may withdraw a mixture of the oil dissolved in the heavy solvent and wax structures and effect separation of the leached solution from the wax structures by means of a centrifuge according to the method disclosed in the Jones Patent 1,930,479. Thus, after introducing the waxy oil into the cold leaching solvent and allowing sufficient time for the solvent to leach the oil from the solidified wax structures, the chilled mixture may be passed to a centrifuge to effect the separation of the oil solvent solution from the crystallized wax. If desired, the wax structures containing oil solvent solution withdrawn via line 19 may be centrifuged after adding a further quantity of cold solvent in order to separate the oil solvent solution from the wax particles. The preferred methods of operation however, are those previously described in connection with the description of Figs. 1 and 2.

The foregoing description of the several modifications of my invention described above are not to be considered as limiting since many variations may be made within the scope of the following claims by those skilled in the art without departing from the spirit thereof.

I claim:

1. A process for dewaxing waxy oil which comprises chilling waxy oil to congeal the same and leaching the congealed waxy oil with a solvent which has a relatively high solvent power for the oil but a relatively poor solvent power for the wax, the temperature of leaching being sufficiently low to maintain said wax in a solid condition, said solvent being of a higher specific gravity than said wax and separating said wax from the oil solvent solution.

2. A process for dewaxing waxy oil which comprises chilling waxy oil to congeal the same and leaching the congealed waxy oil with a solvent which has a relatively high solvent power for the oil but a relatively poor solvent power for the wax, the temperature of leaching being sufficiently low to maintain said wax in a solid condition, said solvent being of a higher specific gravity than said wax and separating said wax from the oil solvent solution by difference of specific gravity of wax and oil solvent solution.

3. A method for separating wax from oil which comprises contacting a waxy oil with a solvent which at low temperature has a solvent power for oil but a lower solvent power for wax and has a specific gravity substantially higher than the specific gravity of the waxy oil and is maintained at a sufficiently low temperature to solidify the waxy oil when contacted therewith, leaching the oil from the solidified wax by contacting the solidified waxy oil and cold solvent and removing the solidified wax from the solution of oil and solvent.

4. A method as in claim 1 in which the solvent is selected from the class of compounds consisting of methylene chloride, ethylene chloride, trichlorethylene, trichlorethane, carbon tetrachloride, tetrachlorethylene, tetrachlorethane, BB' dichlorethylether, acetylene dichloride, furfural or mixtures thereof, mixtures of BB' dichlorethylether and ethylene-dichloride or any of the aforementioned solvents, mixtures of hexachlorethane and ethylene chloride or any of the aforementioned chlorinated solvents, mixtures of liquid sulfur dioxide and aniline or benzol or nitrobenzol or phenol and mixtures of nitrobenzol or phenol, each with benzol, said aforementioned solvents and mixtures of solvents being fluid at the dewaxing temperature and having a specific gravity greater than the specific gravity of the wax desired to be separated from the waxy oil.

5. A method as in claim 1 in which the solvent comprises a chlorinated carbon containing compound which has a high solvent power for oil and a low solvent power for wax at low temperatures, said chlorinated carbon-containing compound being fluid at the dewaxing temperature and having a specific gravity greater than the specific gravity of the wax desired to be separated from the waxy oil.

6. A process as in claim 1 in which the solvent comprises trichlorethylene.

7. A countercurrent method for separating wax from oil which comprises introducing the waxy oil into the lower portion of a container of a solvent having a specific gravity higher than that of the waxy oil and maintained at a low dewaxing temperature, said solvent having a solvent power for oil but a lower solvent power for wax at low temperatures, chilling the waxy oil by contact with said cold solvent to produce a plurality of solidified particles of waxy oil, allowing the solidified particles of waxy oil to flow to the surface of said solvent by the difference in specific gravity and leaching oil fractions from said solidified particles by means of said solvent in said upward passage to leave a wax floating on the surface of said solvent, withdrawing the wax from the surface of liquid in said container and withdrawing oil and solvent from a point below the surface of the liquid in said container.

8. A process as in claim 7 in which the waxy oil is continuously introduced into the bottom of the container, cold solvent is introduced continuously in the upper portion of said container, oil solvent solution is continuously withdrawn from a point below the surface of the liquid in said container and substantially oil-free wax is continuously withdrawn from the surface of the liquid.

9. A process for separating wax from oil which comprises solidifying waxy oil in the form of a sheet by contacting the waxy oil in a cold solvent having a specific gravity above that of the waxy oil, allowing sufficient contact between the solidified waxy oil sheet and the cold solvent to effect leaching of the oil contained in said sheet to leave a layer of solidified wax substantially free from oil, withdrawing the wax from the surface of the solvent and withdrawing oil and solvent from a point below the surface of the wax.

10. A process for separating wax from oil which comprises introducing waxy oil into a container of cold solvent having a specific gravity above that of the waxy oil, solidifying said waxy oil in the form of a sheet by contact with said cold solvent, washing said thin sheet with said cold solvent to leach oil therefrom and to leave a layer of solidified wax floating on the surface of liquid, skimming off the wax from the surface of liquid and withdrawing oil and solvent from a point below the surface of the liquid.

11. A process for separating wax from oil which comprises solidifying waxy oil on the surface of a container of cold leaching solvent, allowing sufficient contact of solidified waxy oil particles and cold leaching solvent to leach oil from said solidified waxy oil particles, skimming off substantially oil-free wax structures from the surface of the liquid in said container and withdrawing said wax particles from a point opposite the introduction of oil in said container, withdrawing oil solvent solution from a point below the surface of liquid in said container and gently agitating the solidified waxy oil in said passage to said withdrawal point.

12. A process for separating wax from wax-oil mixtures which comprises contacting the fluid wax-oil mixture with a solvent liquid at a temperature sufficiently low to congeal said waxoil mixture and thereby congealing the wax-oil mixture, said solvent liquid at the temperature at which it congeals the wax-oil mixture by contact therewith having a high solvent power for the oil but a relatively low solvent power for the wax desired to be separated from said waxoil mixture and said solvent liquid having a specific gravity substantially higher than the specific gravity of the wax desired to be separated from said wax-oil mixture, whereby said wax will float on the surface of the solvent liquid, allowing said congealed wax-oil mixture to remain in contact with said solvent liquid for a time sufficient for the solvent liquid to dissolve the oil from said congealed wax-oil mixture and separating the solution of solvent liquid and oil from the undissolved solid wax.

PHILIP SUBKOW.